Jan. 17, 1950  M. GRAVES  2,494,702
CLUTCH FOR PUNCH PRESSES AND THE LIKE
Filed Dec. 28, 1946  2 Sheets-Sheet 1
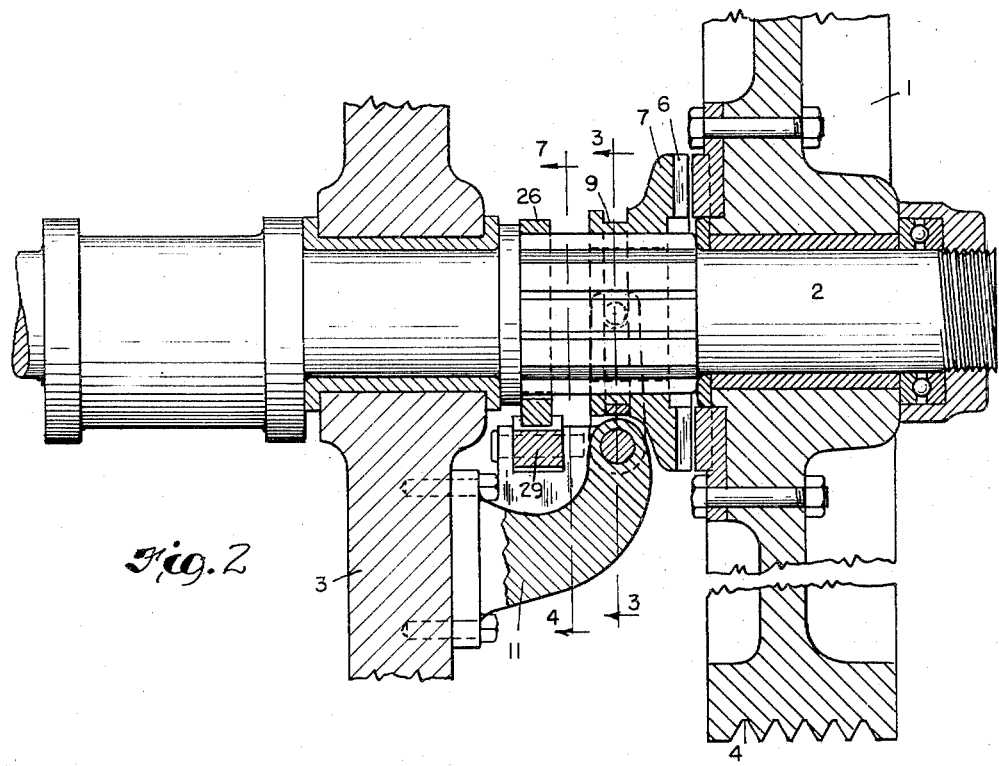
Fig. 2
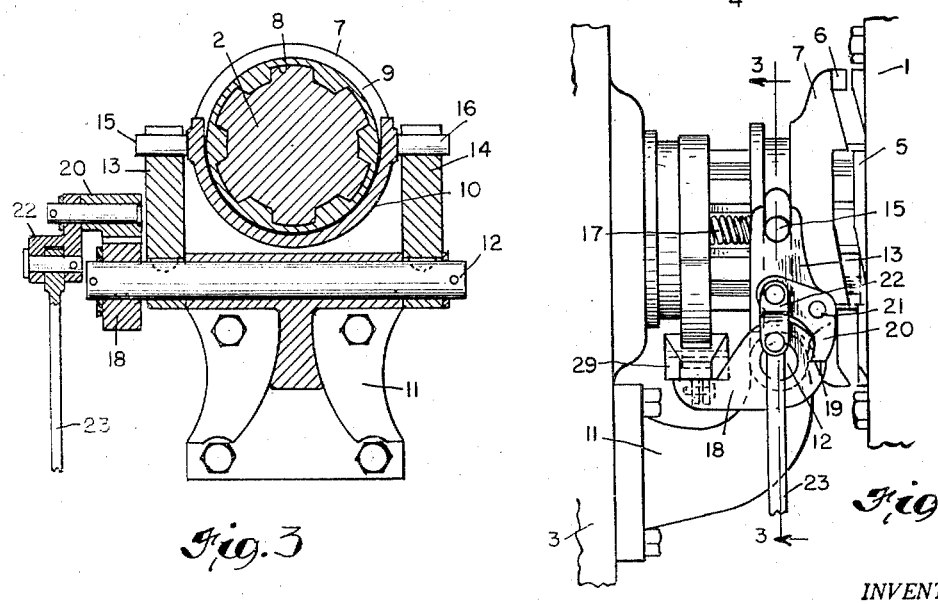
Fig. 3
Fig. 1
INVENTOR.
MARK GRAVES
BY
Oberlin & Limbach
ATTORNEYS.

Jan. 17, 1950　　　　　　M. GRAVES　　　　　　2,494,702
CLUTCH FOR PUNCH PRESSES AND THE LIKE
Filed Dec. 28, 1946　　　　　　　　　　　　　2 Sheets-Sheet 2
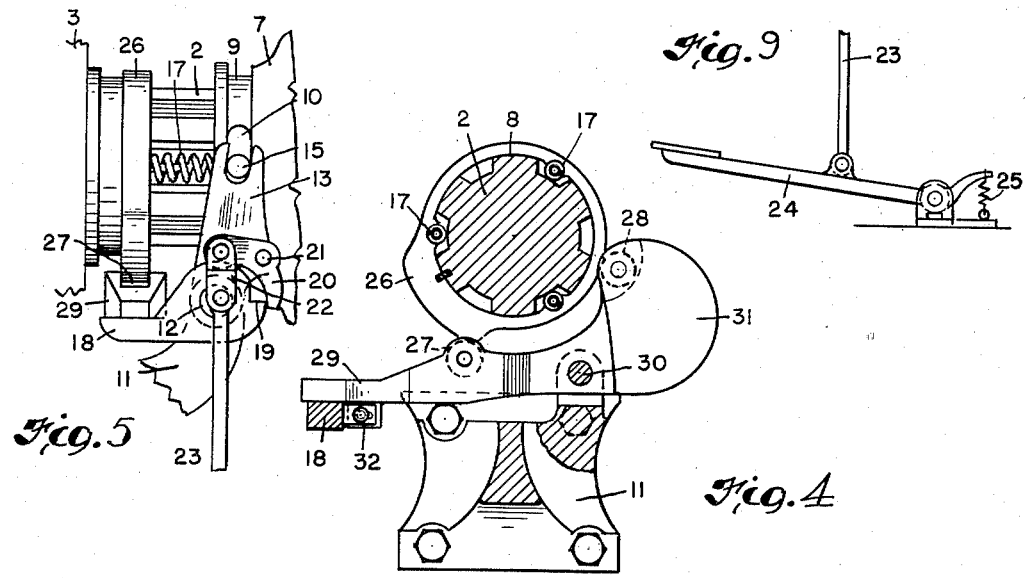
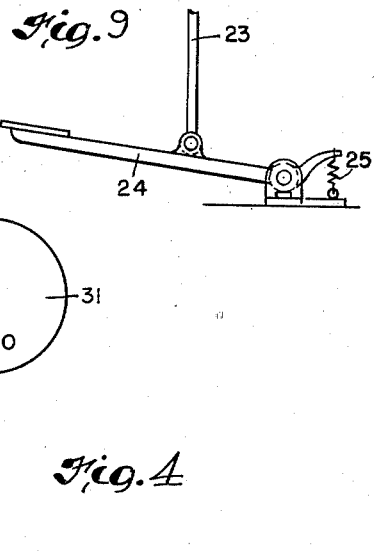
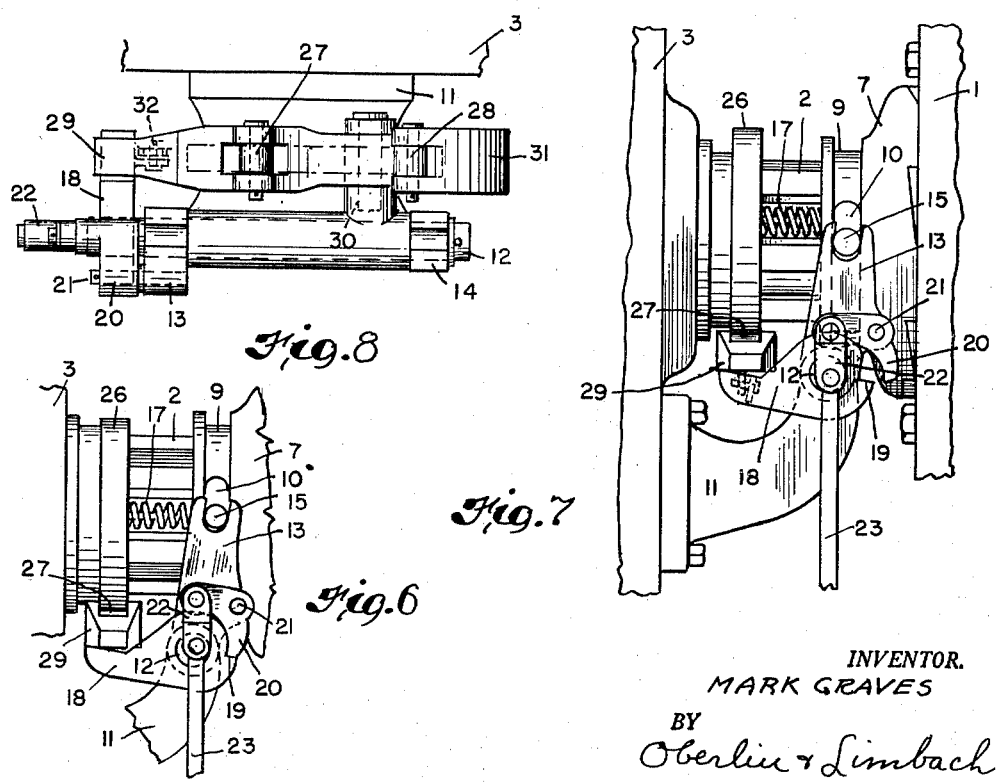
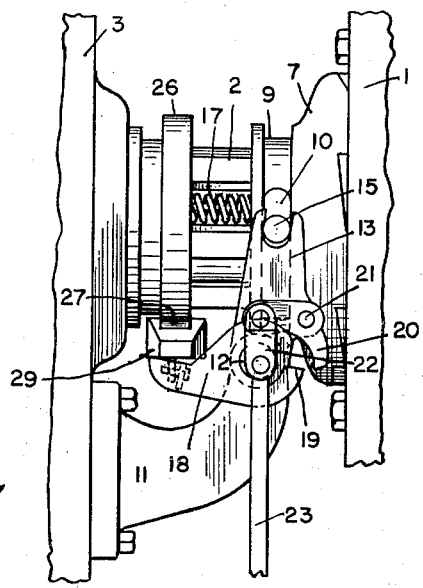
INVENTOR.
MARK GRAVES
BY Oberlin & Limbach
ATTORNEYS.

Patented Jan. 17, 1950

2,494,702

UNITED STATES PATENT OFFICE 2,494,702

CLUTCH FOR PUNCH PRESSES AND THE LIKE

Mark Graves, Cleveland, Ohio

Application December 28, 1946, Serial No. 719,057

9 Claims. (Cl. 192—24)

This invention relates as indicated to a new clutch and more particularly to a clutch especially adapted for use with a punch press or the like.

Machines such as punch presses are usually operated intermittently, power being derived from a large flywheel for operation of the press. It is, accordingly, desirable to provide means whereby the operator may initiate a cycle of operation when desired, with the press being automatically brought to a stop upon completion of such cycle.

It is, therefore, a primary object of my invention to provide a clutch in which a shiftable member will be caused to move into engagement with the flywheel of the press when the operator desires to initiate a cycle, such shiftable member being automatically disengaged therefrom upon completion of the cycle.

Another object is to provide such mechanism in which the parts will be automatically returned to starting position ready for initiation of another cycle.

A further object is to provide such mechanism in which the parts may be of rugged construction and able to withstand the high stresses and strains to which they may be subjected.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevational view of the clutch mechanism of my invention;

Fig. 2 is a vertical sectional view along the main shaft of the machine and showing such clutch mechanism;

Fig. 3 is a transverse sectional view taken along the lines 3—3 on Fig. 1 and Fig. 2;

Fig. 4 is a transverse sectional view taken along the line 4—4 on Fig. 2;

Fig. 5 is an elevational view similar to Fig. 1 illustrating one stage in the cycle of operation;

Fig. 6 is another elevational view similar to Fig. 1 showing a further stage in such cycle;

Fig. 7 is another elevational view similar to Fig. 1 illustrating the operation of the clutch mechanism;

Fig. 8 is a top plan view of the clutch shifting mechanism; and

Fig. 9 is an elevational view of one means whereby the operator may initiate the press cycle.

While the clutch of this invention is adapted for use with many types and sizes of machines, the form illustrated is particularly designed for use with a 60 ton punch press or the like.

Referring now more particularly to the drawings and especially Figs. 1 and 2 thereof, a heavy flywheel 1 is journaled for free rotation about the main shaft 2 of the press, such shaft being journaled in press frame member 3. The flywheel is adapted to be driven from a power source (not shown) by means of V-belts traveling in grooves 4 in the outer periphery of such wheel. The face of the flywheel is provided with dogs 5 adapted to engage dogs 6 of axially shiftable clutch member 7. Such clutch member is keyed to shaft 2 for rotation therewith by means of splines 8 and is provided with a peripheral groove 9 adapted to receive a shifting fork 10. A heavy bracket 11 is bolted to main frame 3 carrying a transverse shaft 12 journaled therein. Two upstanding yoke members 13 and 14 are keyed to such transverse shaft and pivotally engage in their forked ends the stub shafts 15 and 16 of such shifting fork 10. It will thus be seen that yoke members 13 and 14 will be caused to rock about the axis of shaft 12 when clutch member 7 is shifted axially of main shaft 2.

Compression springs 17 are interposed between clutch member 7 and the ends of the slots formed in shaft 2 between splines 8, such springs tending to urge such clutch member into engagement with the flywheel.

A latch member 18 is pivotally mounted on an end of transverse shaft 12 and provided with a shoulder 19 on the end toward flywheel 1. Such shoulder is adapted to be engaged by the end of pawl 20 pivotally mounted at 21 on yoke 13. The other end of such pawl is connected by means of links 22 and 23 to foot treadle 24, normally held in raised position by tension spring 25. Pawl 20 is thus normally urged in a counter-clockwise direction as viewed in Fig. 1 through the action of such links and spring.

As best shown in Figs. 4 and 8, a cam 26 is keyed to shaft 2 adjacent frame member 3 and is adapted to be engaged by cam rollers 27 and 28 carried by rocker arm 29 pivotally mounted at 30 on bracket 11. As will appear from the shape of such cam, both such rollers will engage the same during only that portion of the rotation of the cam when one of the rollers is traveling along the cam hump. The rocker arm 29 is, however, provided with a weighted portion 31 which operates to keep cam roller 27 always in contact with the cam. It will be obvious that resilient means may be employed in addition to, or in place of, such weight, if desired, to accomplish this purpose. The other end of rocker arm 29 is adapted to bear upon the upper surface of an extension of latch member 13 whereby such latch will be positively rocked in a counter-clockwise position upon rotation of the cam, and is connected to such extension of such latch by means of a loose swivel joint 32 adapted to cause such latch member to be rocked in a clockwise direction as viewed in Fig. 1 when arm 29 is rocked in a clockwise direction as viewed in Fig. 4.

The operation of the device of this invention is as follows.

When the pawl 20 is in engagement with shoulder 19 of latch 18, as viewed in Fig. 1, and the other end of such latch is depressed through engagement of roller 27 with the hump of cam 26, clutch member 7 will be held out of engagement with flywheel 1 since yoke 13 is prevented from rotating about the axis of shaft 12. When the operator then momentarily depresses treadle 24, pawl 20 will be disengaged from latch 18 and springs 17 will shift member 7 into engagement with the flywheel. The shifting of such member will cause yoke 13 to be rocked in a clockwise direction, thus slightly lowering the point of pivotal attachment 21 of pawl 20 and preventing reengagement of such pawl with shoulder 19 of latch 18 (see Fig. 5). Since member 7 is keyed to shaft 2 by means of splines 8, shaft 2 will now rotate with the flywheel, operating the press. As cam 26, which is keyed to shaft 2, turns therewith in a clockwise direction, as viewed in Fig. 4, the hump on such cam passes cam roller 27 and rocker arm 29 is rocked in a counter-clockwise direction. Roller 28 cooperates in holding roller 27 against cam hump 26, assisted by the effect of weighted portion 31. This rotates latch 18 in a clockwise direction as viewed in Fig. 5, lowering shoulder 19 thereof to a point where pawl 20 will be reengaged therewith through the action of spring 25 and links 22 and 23 (see Fig. 6). The engagement of the hump of cam 26 with cam roller 28 assures that rocker arm 29 will be thus rocked sufficiently to lower shoulder 19 of latch 18 into pawl engaging position. As cam 26 continues to turn, it will now reengage cam roller 27, rocking arm 29 in a counter-clockwise direction, as viewed in Fig. 4, and returning latch 18 to the position of Fig. 1. Since pawl 20 is now again in engagement with such latch, yoke 13 will be rocked in a counter-clockwise direction, as viewed in Fig. 1, against the force of springs 17, shifting clutch member 7 out of engagement with flywheel 1. Braking means (not shown), conventional on such presses, will operate to stop main shaft 2 in this position. The cycle may then be repeated when the operator next depresses treadle 24.

Of course, if the operator keeps his foot on the treadle, pawl 20 will be prevented from reengaging shoulder 19 of latch 18 even when such shoulder is lowered into pawl-engaging position (see Fig. 7) and clutch member 7 would then remain in driven engagement with the flywheel. In normal operation, however, the operator will merely depress such treadle momentarily causing the press to operate through but one cycle as above explained.

It will be seen from the foregoing that I have provided a clutch mechanism particularly adapted for use with punch presses and the like which is of rugged construction and positive in operation. It also permits of rapid operation of the press since the mechanism is automatically returned to starting position upon the completion of each cycle.

Other modes of applying the principle of the invention may be employed, change being made as regards the details described, provided the features stated in any of the following claims or the equivalent of such be employed.

I therefore particularly point out and distinctly claim as my invention:

1. In a clutch comprising a flywheel and a member axially shiftable into and out of driven engagement with such flywheel, a yoke engaging such shiftable member and pivotally mounted for oscillation about a fixed axis transverse to the axis of such shiftable member and flywheel, resilient means urging such shiftable member toward such flywheel, a pawl on said yoke, a lever adapted to engage said pawl, a cam bearing against said lever adapted in one position to hold the same against pivotal movement and thereby lock said yoke to hold such shiftable member out of engagement with such flywheel, means operative to disengage said pawl from said lever to permit oscillation of said yoke and shifting of such shiftable member by said resilient means, and means operative through such clutch to rotate said cam to rock said lever to re-engage said pawl and then to rock said lever in the opposite direction to oscillate said yoke to disengage said shiftable member from said flywheel.

2. In a clutch comprising a flywheel and a member axially shiftable into and out of driven engagement with such flywheel, a yoke engaging such shiftable member and pivotally mounted for oscillation about a fixed axis transverse to the axis of such shiftable member and flywheel, means urging such shiftable member toward such flywheel, a latch operative to hold said yoke against oscillation to prevent shifting of such shiftable member toward such flywheel, means operative to release said latch to permit such shifting of such shiftable member into driven engagement with said flywheel, and cam means adapted to be rotated with such shiftable member operative first to re-engage said latch with said yoke and thereafter to rock said latch and thereby said yoke to disengage said shiftable member from said flywheel.

3. In a clutch for punch presses and the like, a main shaft, a flywheel freely rotatably journalled on said shaft, a member keyed to said shaft for axial movement into and out of driven engagement with said flywheel, a shifting yoke engaging said shiftable member and pivotally mounted for oscillation about a fixed axis transverse to the axis of said shaft, a pawl on said yoke, a latch pivotally mounted on the frame of such machine adapted to engage said pawl, a cam keyed to said shaft adapted to hold said latch against pivotal movement and thereby prevent shifting of said shiftable member toward said flywheel, means resiliently urging said shiftable member toward said flywheel, and means operative to disengage said pawl and latch to permit shifting of said shiftable member into driven engagement with said flywheel and thereby rotate said shaft, said cam upon being thus rotated being adapted first to rock said latch to re-engage said pawl and then to rock said latch in the opposite direction to oscillate said yoke to shift said shiftable member out of engagement with said flywheel.

4. In a clutch for punch presses and the like, a main shaft, a flywheel freely rotatably journalled on said shaft, a shiftable member keyed to said shaft for axial movement into and out of driven engagement with said flywheel, a shifting yoke engaging said shiftable member and pivotally mounted for oscillation about a fixed axis transverse to the axis of said shaft, resilient means urging said shiftable member toward said flywheel, means operative to lock said yoke against oscillation to prevent shifting of said shiftable member into driven engagement with said flywheel, means operative to release said yoke from said locking means to permit shifting of said shiftable member, and cam means driven by said shaft operative to re-engage said locking means and yoke and then to rock said locking means and yoke to shift said shiftable member out of engagement with said flywheel.

5. In a clutch comprising a flywheel and a member axially shiftable into and out of driven engagement with such flywheel, a yoke engaging such shiftable member and pivotally mounted for oscillation about a fixed axis transverse to the axis of such shiftable member and flywheel, resilient means urging said shiftable member toward said flywheel, a cam adapted to rotate with such shiftable member, means operative to lock said yoke against oscillation to prevent shifting of such shiftable member into driven engagement with such flywheel, and means operative to release said yoke from said locking means to permit shifting of said shiftable member, said cam being thereupon operative as it rotates with such shiftable member to rock said locking means to re-engage said yoke and then rock said locking means and yoke in the opposite direction to shift such shiftable member out of engagement with such flywheel.

6. In a clutch comprising a flywheel and a member axially shiftable into and out of driven engagement with such flywheel, a yoke engaging such shiftable member and pivotally mounted for oscillation about a fixed axis transverse to the axis of such shiftable member and flywheel, means urging such shiftable member toward such flywheel, a cam adapted to rotate with such shiftable member, means operative to lock said yoke against oscillation to prevent shifting of such shiftable member into driven engagement with such flywheel, and control means operative to release said yoke from said locking means to permit shifting of such shiftable means, said cam being thereupon operative as it rotates with such shiftable means to re-engage said locking means and yoke and then to rock said locking means and yoke to shift such shiftable member out of engagement with such flywheel.

7. In a clutch comprising a power driven rotating member and a member axially shiftable into and out of driven engagement with such first-named member, a lever engaging such shiftable member mounted for oscillation about an axis transverse to the axis of such member, means urging such shiftable member toward such power driven member, means operative to lock said lever against oscillation to prevent shifting of said shiftable member into driven engagement with such power driven member, control means operative to release said locking means, and cam means adapted to rotate with such shiftable member and operative first to re-engage said locking means and then to rock said lever to shift such shiftable member out of engagement with such power driven member.

8. In a clutch comprising a power driven rotating member and a member axially shiftable into and out of driven engagement with such first-named member, a lever engaging such shiftable member mounted for oscillation about an axis transverse to the axis of such member, means urging such shiftable member toward such power driven member, means operative to hold said lever against oscillation to prevent shifting of said shiftable member into driven engagement with such power driven member, means operative to release said lever to permit such shifting to engage such power driven member, and means driven through such shiftable member operative to oscillate said lever to shift such shiftable member out of engagement with such power driven member.

9. In a clutch comprising a power driven rotary member and a member shiftable into and out of driven engagement with such first-named member, means urging such shiftable member toward such power driven member, a latch adapted to hold such shiftable member against movement toward such power driven member, and means driven through such shiftable member, upon release of said latch and engagement of such shiftable member with such power driven member, operative first to re-lock said latch and then to move said latch to shift such shiftable member out of engagement with such power driven member.

MARK GRAVES.

REFERENCES CITED

The following references are of record in the file of this patent:

UNITED STATES PATENTS

| Number | Name | Date |
| --- | --- | --- |
| 1,383,525 | Carroll | July 5, 1921 |
| 2,260,416 | Wentworth et al. | Oct. 28, 1941 |
| 2,271,359 | Zeruneith | Jan. 27, 1942 |